Aug. 2, 1966  G. E. BARKER  3,264,055
TREATMENT OF METALWORKING FLUIDS
Filed April 3, 1963  4 Sheets-Sheet 1
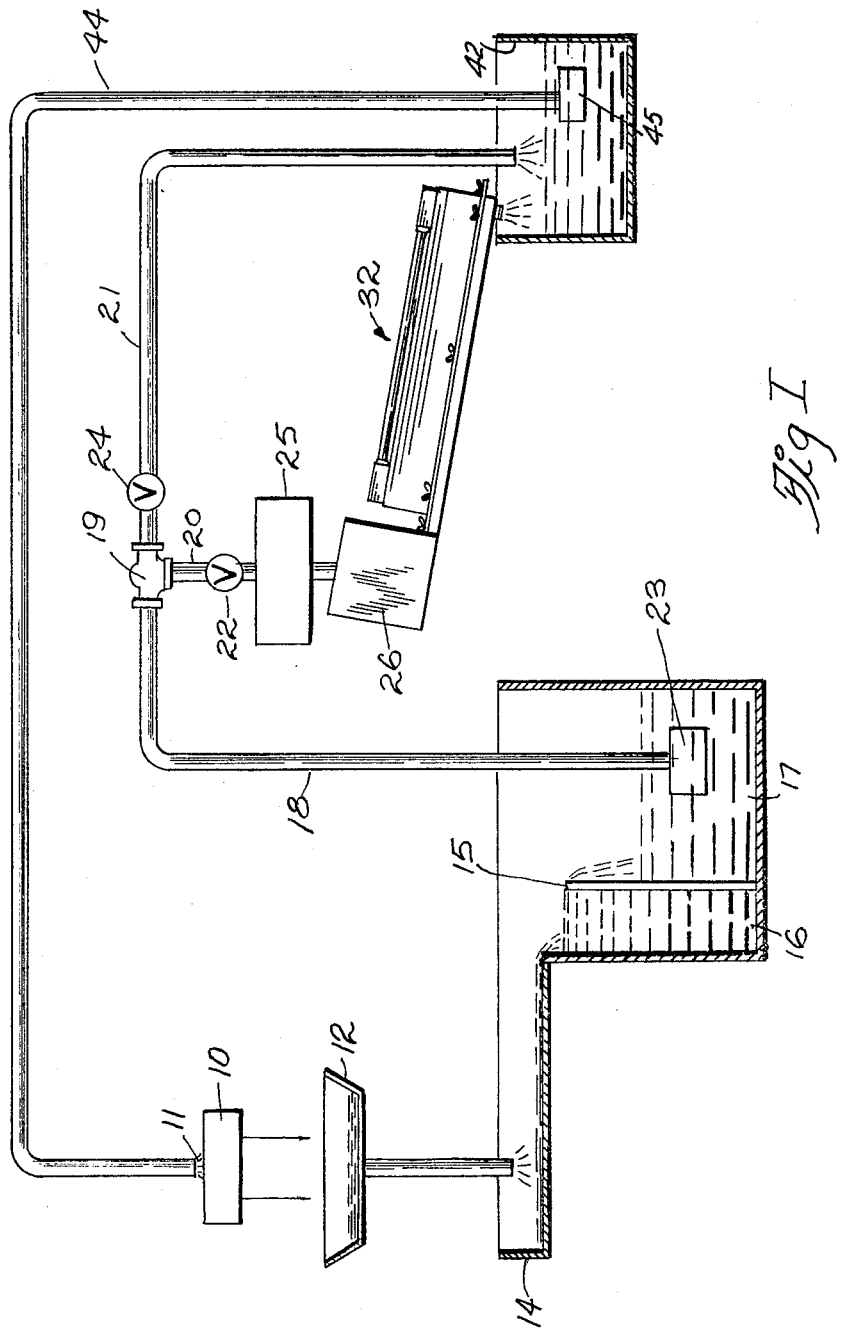
Fig. I
INVENTOR.
GEORGE E. BARKER
BY
PENDLETON, NEUMAN,
SEIBOLD & WILLIAMS
Attys.

Aug. 2, 1966
G. E. BARKER
3,264,055
TREATMENT OF METALWORKING FLUIDS
Filed April 3, 1963
4 Sheets-Sheet 2
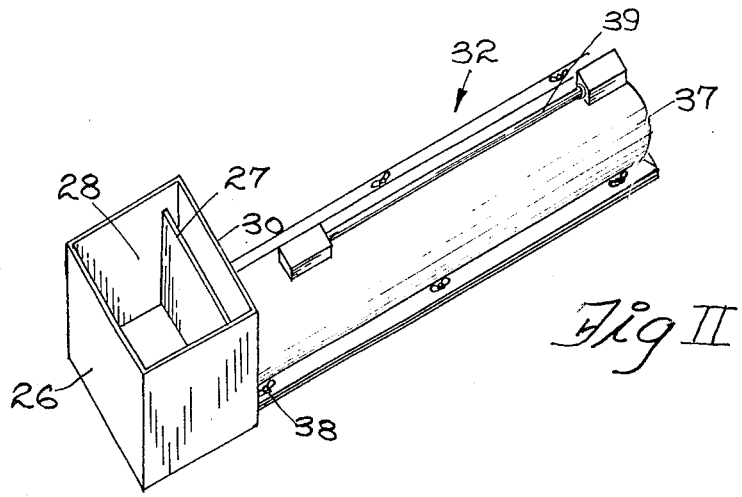
Fig II
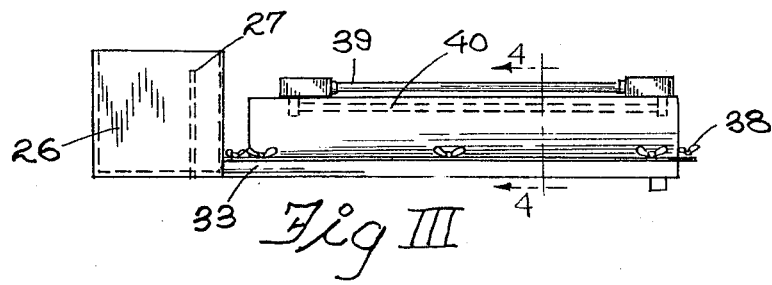
Fig III
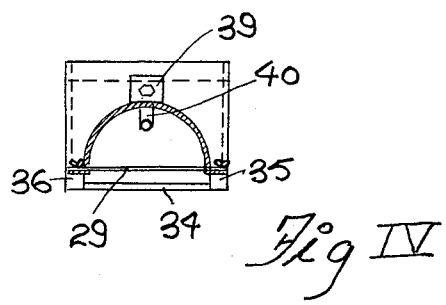
Fig IV
INVENTOR.
GEORGE E. BARKER
BY
PENDLETON, NEUMAN,
SEIBOLD & WILLIAMS
Attys.

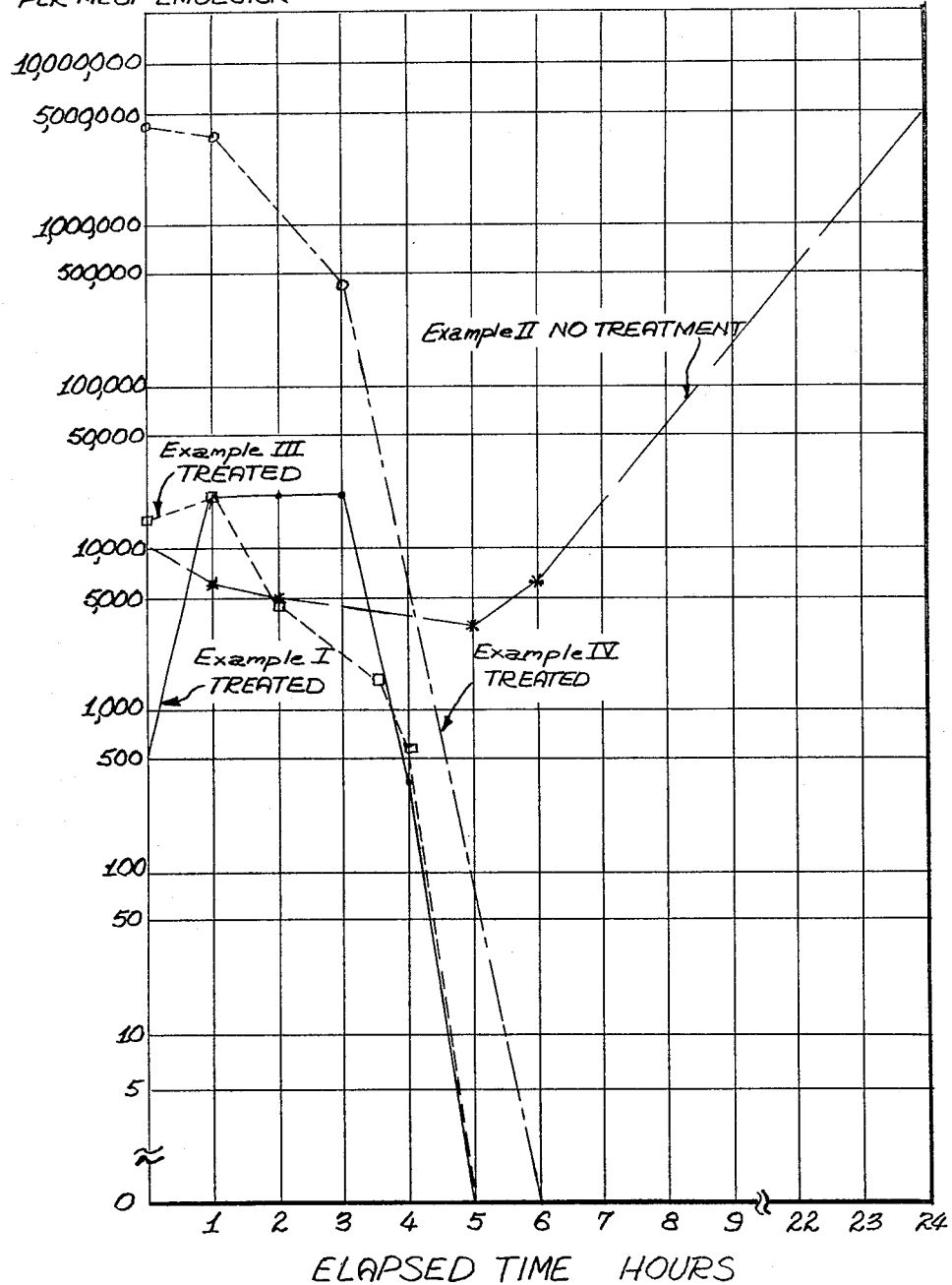
Fig V

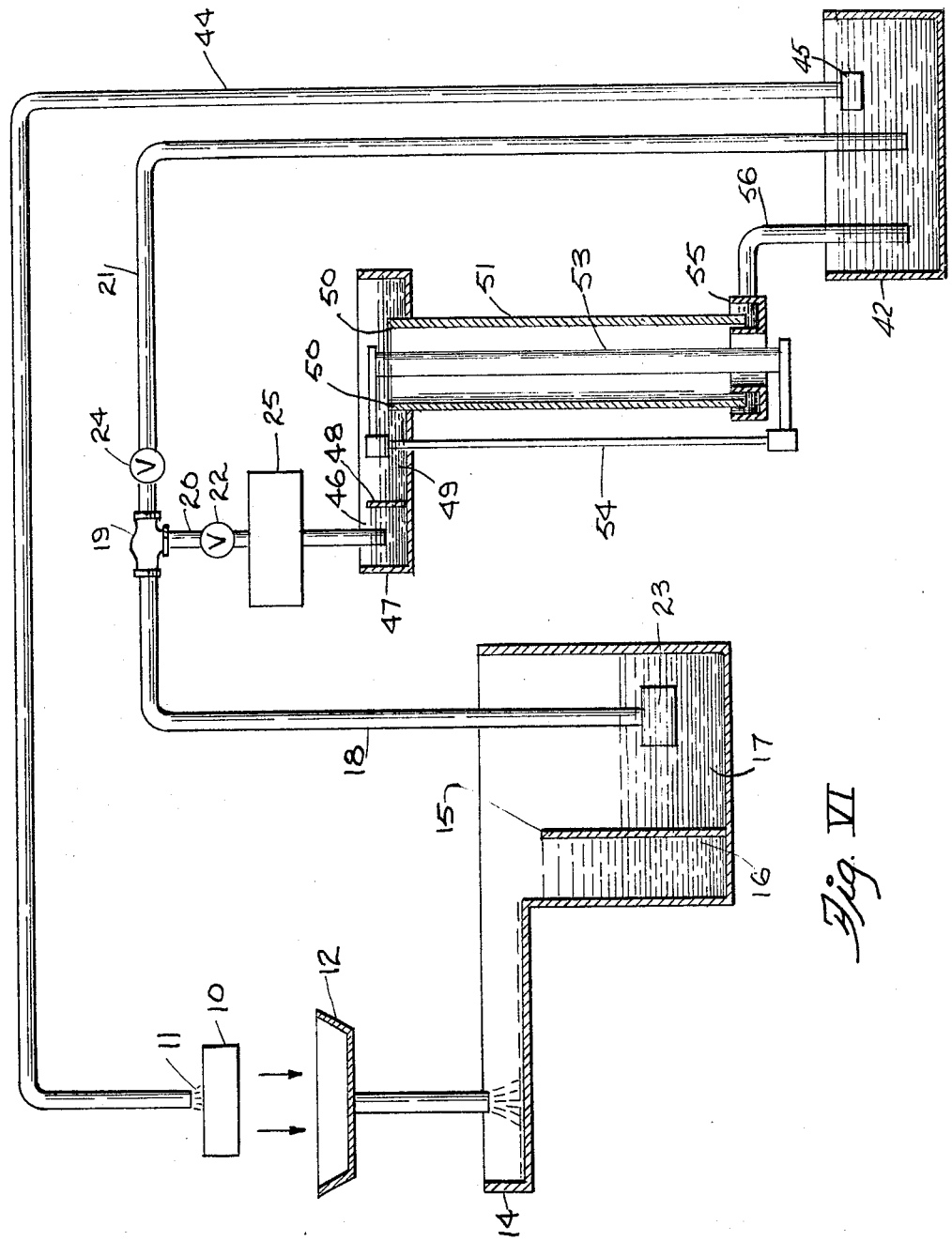

3,264,055
TREATMENT OF METALWORKING FLUIDS
George E. Barker, Glencoe, Ill., assignor to Van Straaten Chemical Company, Chicago, Ill., a corporation of Illinois
Filed Apr. 3, 1963, Ser. No. 270,368
2 Claims. (Cl. 21—54)

This invention relates to methods and apparatus for treating fluids employed as coolants and lubricants in metalworking operations.

As is well known, liquids comprising aqueous solutions or emulsions are employed for cooling and lubricating purposes in metalworking operations. These fluids serve a multitude of functions including the promotion of longer tool life, the reduction of temperature at the tool-work interface and the removal of chips and fines from the work area. In metalworking manufacturing plants it is highly desirable and mandatory for maximum economy to retain the coolant liquids in a recirculating system so that they may be used over and over. These liquids generally comprise aqueous solutions or emulsions (oil in water) composed principally of organic substances dissolved or dispersed in water. The nature of these organic substances varies widely but often includes mineral oils, fats, soaps, synthetic surface active agents, and small quantities of special additives to serve as film plasticizers, antifoam agents, and rust inhibitors. Very often microorganisms from varied sources are unintentionally introduced into these systems. The organic nature of the ingredients in these systems serves as food or nutrients for the microorganisms and thus permits rapid growth. The action of these microorganisms on the ingredients of these coolants produces products of metabolism which may be evidenced by foul odors and other changes in the system. The action of the microorganisms may destroy the emulsifying system and thereby cause the emulsions to break and/or they may develop acids which will cause the emulsions to break and many times promote corrosion of metals in contact therewith. This development of foul odors or/and acidity is generally referred to in metalworking plants as "rancidity."

Past attempts to overcome the rancidity problems generally have involved the incorporation of soluble liquid and solid germicides into the coolant liquids either prior to their use in the metalworking operation or subsequent thereto. Obviously, because of the nature and use of these coolant liquids, germicides which are suitable for use therein must be non-toxic and non-irritating. This, of course, seriously limits the choice of germicides which can be used and the use of these germicides to control the rancidity problems is not completely satisfactory. For example, there is no one germicide effective with all organisms encountered under normal conditions of use and some germicides produce undesirable changes in the fluid during use. Moreover, many germicides are incompatible with the coolant concentrates and are too toxic for use in these systems and the effectiveness of germicides in the metalworking coolants is altered by the various ingredients in the composition.

It is an object of this invention to provide a novel method of treating metalworking coolant fluids to reduce or eliminate microbiological action in such fluids and thereby eliminate the rancidity commonly associated with the use of these liquids.

It is another object of this invention to provide a method of treating metalworking coolant fluids to eliminate the disagreeable effects associated with rancidity in these liquids which include the development of foul odors and the breaking of oil-in-water emulsions which comprise such fluids.

It is a further object of the invention to provide a method of treating metalworking coolant liquids to overcome the rancidity problems associated therewith, which method can be carried out in a convenient and simple manner and which does not involve the incorporation into the liquids of chemical germicides.

It is another object of the invention to provide an apparatus adapted for use in the process disclosed herein.

In accordance with the process of the present invention a metalworking coolant liquid which is brought in contact with work pieces during the working thereof is removed from the work pieces and a substantial portion of the solids present therein removed. The metalworking coolant liquid is then exposed in substantially uniform manner to ultraviolet energy having a wave length in the range of 2200 to 3000 Angstroms. The rate of application of the ultraviolet radiation is relatively critical in order to accomplish the desired results. Specifically, the ultraviolet radiation must be supplied at a rate such that the product of the power (in the ultraviolet range) expressed in watts supplied at the liquid surface per unit volume (cubic feet) times depth (feet) of fluid required to absorb 90% of the incident ultraviolet radiation times the average generation time (seconds) of the microbiological species present therein is equal to or greater than about 1 watt-second-per square foot. When the ultraviolet energy is supplied at a rate substantially less than specified, the microbiological population of the coolant liquid is not decreased substantially. For the purpose of this invention, the ultraviolet energy must be supplied at a rate sufficient to prevent an increase and/or to effect a net decrease in the microbiological population of the coolant liquid. When treating metalworking coolant liquids having no microbiological contamination, it is desired to maintain this condition, while in other cases it may be desirable to decrease or eliminate the microbiological population of a coolant liquid.

The relationship of the various factors pertaining to the ultraviolet radiation required for satisfactory treatment of the metalworking coolant liquids can be expressed mathematically as follows:

$$\frac{Pdt}{V} \geq 1$$

$P$ = Ultraviolet radiation power supplied at liquid surface
$d$ = Thickness of film required to absorb 90% of incident ultraviolet radiation
$t$ = Average generation time of organisms
$V$ = Volume of liquid system The power of the ultraviolet radiation source is expressed in watts. Generally the power of an ultraviolet radiation source such as a lamp is provided by the manufacturer of the equipment, but can be readily measured for any given system utilizing a spectrophotometer or photoelectric cells designed for measuring radiation in the ultraviolet region. The commercial rating of a lamp is the power consumed if the given lamp is used as a source of ultraviolet; the power converted to ultraviolet radiation depends on the efficiency of the lamp.

The depth of fluid required to absorb 90% of incident ultraviolet radiation can be determined by measuring the thickness of a particular coolant liquid required to absorb 90% of the incident radiation. This value may be calculated with the use of the following equation:

$$d = \frac{1}{e}$$

where $d$ = depth of fluid in millimeters required to absorb 90% of incident radiation
$e$ = extinction coefficient, which is reciprocal of thickness required to absorb 90% of incident radiation Photometers are generally calibrated directly in $$\log_{10} \frac{I_o}{I}$$

so this reading can be used to calculate extinction coefficient $e$, using a known thickness of fluid, $x$.

$$e = \frac{1}{x} \log_{10} \frac{I_o}{I}$$

where $x$ is the film thickness for a particular cell used for the measurement expressed in millimeters.

$I_o$ = intensity of incident radiation
$I$ = intensity of transmitted radiation To convert $d$ in millimeters to feet, multiply by 0.00328.

The average generation time of a microbiological species is the time in seconds required for the population of microorganisms in a system to double. The average generation times of organisms are known and for the common organisms generally ranges from 15 to 100 minutes or higher. The generation times of microorganisms are reported in standard reference works such as, for example, the Handbook of Biological Data, edited by William S. Spector, published by W. B. Saunders Company, copyright 1956. The generation time of several common species of microorganisms is as follows:

*Generation time of several species of bacteria*

| Bacterium | Medium | Generation time (minutes) |
| --- | --- | --- |
| Aerobacter aerogenes | Broth | 16–18 |
|  | Synthetic | 29–44 |
| Bacillus mycoides | Broth | 28 |
| Escherichia coli | do | 17 |
| Lactobacillus acidophilus | Milk | 66–87 |
| Salmonella typhosa | Broth | 27–30 |
| Pseudomonas flurocsens | do | 40 |
| Staphylococcum aureus | do | 27–30 |

The present invention will be further described in conjunction with the accompanying drawings wherein:

FIGURE I is a schematic flow diagram illustrating one presently preferred embodiment of the present process for treating metalworking coolant liquids to overcome rancidity problems normally associated with the use thereof.

FIG. II is a perspective view of apparatus providing a source of ultraviolet radiation.

FIG. III is a vertical sectional view of the apparatus of FIG. II.

FIG. IV is a view taken on the line 4—4 of FIG. III.

FIG. V is a graph showing the effectiveness of the present invention in eliminating from metalworking coolant liquids microorganisms the presence of which results in the liquids becoming rancid.

FIG. VI is a schematic flow diagram similar to that shown in FIG. I, but illustrating another embodiment of the apparatus, shown in sections, providing a source of ultraviolet radiation.

Referring to FIG. I, the numeral 10 designates a metal work piece which, during the working thereof, is subjected to spray 11 of a metalworking coolant and lubricant liquid. After contacting the work piece 10, the coolant liquid is collected in drain 12 and eventually discharged into a collection sump 14. The collection sump 14 is preferably provided with a weir 15 by virtue of which separation of solids (metal particles or shavings) contained in the coolant liquid is achieved. The relatively heavy metal particles tend to settle toward the bottom of the sump in the section thereof designated 16 while the coolant liquid flows over weir 15 into the main section 17 of the sump 14. The coolant liquid is pumped from sump 14 through line 18 and by means of suitable connection 19 can be directed either through line 20 for treatment in accordance with the invention or through by-pass line 21 in which case the used coolant is directed to a collection reservoir without treatment. The numeral 23 designates pump means for withdrawing coolant liquid from sump 14 and transporting it through line 18. Any pump means suitable for pumping liquids of the type under consideration can be employed. Valves 22 and 24 control flow through conduits 20 and 21 respectively. Local conditions and requirements dictate the proportion of the coolant liquid which is passed through line 20 and treated in accordance with the invention, it being possible to treat all of the coolant liquid, a portion thereof or none. By treatment of the entire body of the microbiological-contaminated coolant a substantially sterile recycle liquid is obtained whereas if only a portion of the coolant liquid is treated the microorganism population can be maintained at a sufficiently low value to prevent severe rancidity although all of the coolant may not be absolutely sterile.

The coolant liquid to be treated in accordance with the invention is passed through line 20, valve 22 controlling the flow thereof, and is preferably filtered at 25 to remove metal particles which may still be present therein. Any filtration or other equipment suitable for separating solids and liquids can be employed at 25. After separation of the solids, the coolant liquid discharges into header tank 26. As seen more clearly in FIG. II, a baffle plate or weir 27 is provided within header tank 26 to permit a build-up of the coolant liquid to be treated in chamber 28 of the tank 26. The coolant liquid, after building up in chamber 28, flows over the weir 27 and through a transversely extending narrow slot 29 which is provided in the wall 30 of the header tank 26. The stream of coolant liquid then flows through the ultraviolet radiation unit designated by numeral 32. This radiation unit 32 comprises a generally U-shaped flow trough 33 having a bottom 34 and two vertically extending sides 35 and 36. A housing 37 encloses the trough 33 and is attached thereto by bolts 38. The housing 37, having a shiny interior surface, serves as a reflector for the ultraviolet radiation and includes a longitudinally extending ultraviolet lamp holder 39 in which is disposed an ultraviolet lamp 40. The ultraviolet lamp 40 can be any known source of ultraviolet radiation or ultraviolet lamp, a number of which are commercially available in different sizes (length and diameter) and power ratings (watts). The effectiveness of the ultraviolet lamp for the present invention is primarily dependent on its intensity and the exposure time of the coolant liquid thereto. Accordingly, the power and size of ultraviolet lamp utilized can be varied so as to correlate with the amount of coolant liquid undergoing treatment and the flow rates thereof. For example, in a system employing a flow trough 33 having a width of 6 inches and a length of 23 inches, an ultraviolet lamp of 78 watts (ultraviolet region) and $11^{25}/_{32}$ inches effective length and having a tube diameter of 1⅛ inches can be satisfactorily employed. The ultraviolet lamp can be spaced approximately 3 inches above the flow trough 33 when the depth of the coolant stream is from about ¹⁄₁₆ to ⅛ inch.

After exposure to the ultraviolet energy, the treated coolant liquid flows into a reservoir 42 from which it is withdrawn by pump means 45 and recycled through line 44 for reuse in the working of metals.

Referring to FIG. VI, the numerals 1 through 45 designate components of the system identical to those described in the discussion of FIG. I. The operation of this alternate apparatus is identical to that described with reference to FIG. I up to the point where the metalworking fluid flows out of the optional filtering device 25. The coolant liquid then discharges into a calming chamber 46 formed by the walls of a header tank 47 and a transverse weir 48. The liquid level builds up in said calming chamber 46 until it attains a level sufficient to overflow the weir 48 and flow into the distribution chamber 49 which forms the remainder of header tank 47. The level of fluid in the distribution chamber then builds up until it attains a height sufficient to overflow a second weir 50 which is formed of a vertical cylindrical tube which extends up through the bottom of header tank 47. The fluid then flows downward under the influence of gravity over the interior walls of the tube 51 in the form of a relatively non-turbulent contiguous film. A source of ultraviolet radiation 53 is positioned within the vertical tube 51 with an appropriate holder or positioning device 54, thus subjecting the peripheral film of metalworking coolant to the influence of the ultraviolet radiation. The fluid then flows from the lower end of tube 51 into a collecting chamber 55 which surrounds lower edge of the tube 51. The fluid then flows from chamber 55 through line 56 and into reservoir 42, from which point the flow again becomes identical to that described with reference to FIG. I.

It should be apparent that numerous modifications of the above described apparatus are possible, all of which would lie within the scope of the present invention. For example, providing suitable sealing means at the juncture of the header tank 47 and the tube 51 will permit the tube to be rotated about its longitudinal axis while the metalworking fluid is flowing through it. Among the desirable effects achieved by this modification are the development of a more uniform distribution of the fluid about the interior periphery of the tube, and the ability to operate efficiently when the tube is in a non-vertical position. Again, it may be desirable in some situations that the tube 51 have a non-circular cross-section, or a cross-section which changes from top to bottom. Variations of this type are indicated when the source of ultraviolet radiation has significant directional variation.

The following examples illustrate the efficacy of the present invention in reducing the microbiological population of metalworking coolant liquids.

EXAMPLE I

A 33-gallon batch of a metalworking coolant liquid was made by emulsifying one part of a soluble mineral lubricating oil composition with 32 parts of water. The soluble oil composition was a standard product employed in metalworking coolant liquids and is composed of a mineral lubricating oil, petroleum sulfonates and soaps. The soluble oil composition contained no chemical germicidal agents. A 1-milliliter sample of a 24-hour culture of *Pseudomonas aeruginosa* was mixed with 100 milliliters of nutrient broth. The soluble oil emulsion was placed in a 55-gallon drum and was inoculated with the described bacteria-broth mixture. The inoculated emulsion was then pumped through the system described in FIG. I at the rate of 2 gallons per minute. A mercury lamp, very rich in ultraviolet radiation in the predominant wave length of 2537 Angstroms, which is characteristic of mercury vapor, was employed as the source of ultraviolet radiation. The emulsion was circulated through the system for about 1.5 hours to achieve even distribution of the organisms and was sampled for determination of the organism population prior to treatment in accordance with the invention. The ultraviolet lamp was turned on and operated for 6 hours, thereby subjecting the coolant to ultraviolet radiation in accordance with the invention. The metalworking coolant liquid was sampled for determination of the organism population every hour for 6 hours and again after 24 hours. After several hours of circulation through the system the microorganism population decreased very rapidly and the liquid remained substantially sterile for at least 24 hours, even though the ultraviolet radiation was discontinued after 6 hours operation. The results achieved are graphically shown by the data plotted in FIG. V.

EXAMPLE II

The procedure of Example I was repeated except that the metalworking coolant was not exposed to ultraviolet radiation. This procedure served as a control. Although the microorganism population decreased slightly after 5 hours of circulation through the system, it started to increase rapidly thereafter and at the end of the 24 hours the microorganism population had increased tremendously. The results are plotted in the graph of FIG. V.

EXAMPLE III

A 33-gallon batch of the soluble oil emulsion described in Example I was placed in a 55-gallon drum and inoculated with a 1 milliliter sample of a 24-hour culture of *Escherichia coli* mixed with 100 milliliters of nutrient broth. The inoculated emulsion was pumped through the system of FIG. I at the rate of 2 gallons per minute for 1.5 hours before sampling to obtain the initial microorganism population. The ultraviolet lamp was turned on and operated for 6 hours with samples being taken at intervals for determination of the microorganism population. The microorganism population decreased very rapidly after 3.5 hours producing a sterile system after 5 hours. The system remained sterile for 24 hours, although the ultraviolet radiation was discontinued after 6 hours. The results are graphically presented in FIG. V.

EXAMPLE IV

To a 32-gallon batch of a soluble oil emulsion as described in Example I was added 1 gallon of a "rancid" commercial soluble oil from the central coolant system of an automotive plant. This mixture was placed in a 55-gallon drum and circulated through the system described in FIG. I for 1.5 hours. The emulsion was then sampled to determine the microorganism population before and after turning on the ultraviolet lamp. The emulsion was sampled periodically. The population of the organisms decreased rapidly after 3 hours, the emulsion becoming sterile in 6 hours and remaining so for 24 hours. These results are presented in FIG. V.

EXAMPLE V

Utilizing a system substantially as described in FIG. I of the drawings, a metalworking coolant liquid was treated in a number of runs. Utilizing a mercury vapor lamp, the various factors affecting operability of the process are tabulated below with respect to translucent and opaque coolant liquids. The indicated 90% absorption of ultraviolet radiation was determined for the 2650 Angstroms wave length. The data obtained in these runs is summarized in the table.

*Tabulation of experiments*

| Lamp, Manufacturer's Rating (watts) | None | 25 | 25 | 1,500 | 1,500 | 1,500 | 1,500 |
|---|---|---|---|---|---|---|---|
| Power Supplied at Liquid Surface, P (watts) | | 5 | 5 | 78 | 78 | 78 | 78 |
| Distance Between Lamp and Fluid (in.) | | 2⅝ | 2⅝ | 3 | 3 | 3 | 6½ |
| Film Thickness Absorbing 90% Incident Radiation, $d$ (in.) | (¹) | ¹0.011 | ²0.00124 | ²0.00124 | ²0.00124 | ²0.00124 | ²0.00124 |
| Volume of System, V (gal.) | 10 | 10 | 10 | 10 | 20 | 34 | 10 |
| Avg. Generation Time of Organisms, $t$ (minutes) | 35 | 35 | 35 | 35 | 35 | 35 | 35 |
| $Pdt/V$ (watt sec./sq. ft.) | | 7.2 | 0.8 | 12.7 | 6.4 | 3.7 | 12.7 |

¹ Translucent.
² Opaque.

| Elapsed Time Exposure (hr.) | Organisms Per Milliliter of Emulsion (Pseudomonas aeruginosa) | | | | | | |
|---|---|---|---|---|---|---|---|
| 0 | 9,100 | 12,500 | 5,690 | 28,900 | 14,000 | 2,820 | 63,000 |
| ½ | | | | 18,600 | | 2,680 | 35,600 |
| 1 | 12,300 | 900 | 4,490 | 12,300 | 8,500 | 1,850 | 6,700 |
| 1½ | | | | 1,810 | 1,150 | | 590 |
| 2 | 5,600 | 110 | | 250 | 1,220 | 2,280 | 30 |
| 2½ | | | | 0 | 440 | | 0 |
| 3 | 17,200 | 20 | | 0 | 20 | 1,140 | 0 |
| 4 | 12,100 | 0 | 1,010 | 0 | 0 | 220 | 0 |
| 5 | 16,800 | 0 | 1,110 | 0 | 0 | 0 | 0 |
| 6 | 19,600 | | 1,100 | 0 | 0 | 0 | 0 |
| 24 | 2,700,000 | | 3,490 | | | | |
| 29 | | | 16,500 | | | | |
| 53 | | | 169,000 | | | | |
| 77 | | | 1,660,000 | | | | |

In the above runs, the depth ($d$) or film thickness of the metalworking coolant liquid required to absorb 90% of the incident radiation was calculated from spectrographic data to be 0.011 inch for the translucent liquid and for the opaque films 0.00124 inch. As seen, when the rate of application of the ultraviolet radiation per square foot is less than 1.0 watt-second per square foot, the desired results are not obtained. The significance of exposure time with respect to germicidal effect is also seen from the data in the table.

The advantages and benefits of the invention are readily apparent from the foregoing description. With the method and apparatus of the present invention, a metalworking coolant sytem is obtained which will operate indefinitely so far as microbiological contamination is concerned. By means of the present invention the microbiological population of metalworking coolant liquids can be eliminated or maintained at levels sufficiently low to substantially eliminate rancidity in these liquids caused by the presence therein of the microorganisms. In contrast to the toxic properties possessed by certain chemical germicides, ultraviolet radiation imparts no toxic or irritating properties to the metalworking coolants. It does not affect the stability of the aqueous emulsions or solutions which comprise the metalworking coolants. With the method and apparatus of the present invention a system is obtained from which the coolant liquid need not be drained for cleaning at frequent intervals as is necessary with the use of conventional chemical germicides. The process is suitable for treatment of metalworking coolant liquids translucent or opaque in nature.

Those modifications and equivalents which fall within the spirit of the invention and the scope of the appended claims are to be considered part of the invention.

I claim:

1. In a system wherein a metalworking fluid comes into contact with a metal being worked and is thereafter collected and recycled and in the course of use and recycling is subjected to contamination by the random introduction therein of microorganisms from an exterior source, the improvement which consists in subjecting at least part of said metalworking fluid to the action of ultraviolet radiation to prevent an increase in microorganism population, said radiation being supplied at a rate such that the product of the ultraviolet power supplied at the liquid surface (watts) times the depth of fluid required to absorb 90% of the incident ultraviolet radiation (feet) times the average generation time of the microbiological species (seconds) all divided by the volume of fluid contained in the system (cubic feet), when all factors are expressed in consistent units, will be at least about 1 watt second per square foot.

2. The method of claim 1 wherein the said metalworking fluid is subjected to ultraviolet energy having a wave length in the range of 2600 to 2700 Angstroms.

References Cited by the Examiner

UNITED STATES PATENTS

| | | |
|---|---|---|
| 2,001,555 | 5/1935 | Trebler. |
| 2,018,332 | 10/1935 | Trebler et al. _____ 250—49 X |
| 2,189,279 | 2/1940 | Bitner. |
| 2,452,201 | 10/1948 | Levinson et al. |
| 2,482,507 | 9/1949 | Rentschleer et al. |
| 2,588,716 | 3/1952 | Gochenour et al. ____ 250—49 X |
| 2,725,482 | 11/1955 | Levinson et al. _____ 21—91 X |
| 2,844,727 | 7/1958 | Maciszewski et al. ____ 250—43 |

FOREIGN PATENTS

| | | |
|---|---|---|
| 25,715 | 1913 | Great Britain. |

MORRIS O. WOLK, *Primary Examiner.*

J. ZATARGA, *Assistant Examiner.*